(12) United States Patent
Fukuda et al.

(10) Patent No.: US 6,608,955 B2
(45) Date of Patent: Aug. 19, 2003

(54) OPTICAL FIBER AND LASER MACHINING APPARATUS

(75) Inventors: Keiichiro Fukuda, Yokohama (JP); Takemi Hasegawa, Yokohama (JP); Masaharu Mogi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/052,494

(22) Filed: Jan. 23, 2002

(65) Prior Publication Data

US 2002/0164136 A1 Nov. 7, 2002

(30) Foreign Application Priority Data

Jan. 23, 2001 (JP) ..................... P2001-014817

(51) Int. Cl.[7] .............. G02B 6/02; G02B 6/20
(52) U.S. Cl. ..................... 385/125; 385/123
(58) Field of Search ................. 385/125, 123, 385/124, 126–128; 65/385, 397

(56) References Cited

U.S. PATENT DOCUMENTS 5,891,210 A * 4/1999 Watanabe et al. ............ 65/406
6,097,870 A * 8/2000 Ranka et al. ............... 385/127
6,334,017 B1 * 12/2001 West ........................ 385/123
6,334,019 B1 * 12/2001 Birks et al. ................ 385/125
6,385,380 B1 * 5/2002 Friedrich et al. ........... 385/125
6,404,966 B1 * 6/2002 Kawanishi et al. ......... 385/125
6,418,258 B1 * 7/2002 Wang ....................... 385/125
6,445,862 B1 * 9/2002 Fajardo et al. ............. 385/125
2003/0056550 A1 * 3/2003 Tanaka et al. ............... 65/428

OTHER PUBLICATIONS

Optics Letters/vol. 22, No. 7/ Apr. 1, 1997 p. 484–485.
Optics Letters/vol. 24, No. 17/Sep. 1, 1999 p. 1203, 1205.
Optics Letters/vol. 22, No. 13/Jul. 1, 1997.
Optics Letters/vol. 21, No. 19/Oct. 1, 1996 p. 1547–1549.
Recent Progress in Photonic Crystal Fibres.

* cited by examiner

Primary Examiner—Brian Healy
Assistant Examiner—Daniel Petkovsek
(74) Attorney, Agent, or Firm—McDermott, Will & Emery

(57) ABSTRACT

An optical fiber has a core region and a cladding region surrounding the core region. The core region and the cladding region are made of a base material containing silica glass as a principal component. A plurality of holes extending along an axial direction are arranged at least in the cladding region. In the optical fiber, the base material has a hydroxyl mole fraction of not less than 10 ppm, or a fluorine content of not less than 0.2% by weight.

9 Claims, 9 Drawing Sheets

OPTICAL FIBER AND LASER MACHINING APPARATUS

BACKGROUND OF THE INVENTION

1. Field of the Invention

The present invention relates to an optical fiber for guiding ultraviolet light and laser machining apparatus using them.

2. Related Background Art

The ordinary optical fibers is made of pure silica glass and the core region thereof is doped with germanium. Such optical fiber is not suitable for transmission of light in the wavelength region of 150 nm to 400 nm (ultraviolet light). This is because the ultraviolet light is absorbed by the dopant of germanium added in the silica glass in order to raise the refractive index of the core region.

There is thus a known technique of making the core region of pure silica glass and doping the cladding region with fluorine F to decrease the refractive index of this region, thereby forming a waveguide capable of transmitting the ultraviolet light. However, bend loss is easy to occur in the waveguide, because the index difference (relative index difference) cannot be set at a sufficiently large value between the core and the cladding. A strong ultraviolet beam like the excimer laser light produces defects in the core region to increase transmission loss.

Proposed in order to prevent the production of defects was the optical fiber using pure silica glass and having the hydroxyl-doped core region. Such optical fiber is under practical use for transmission of light in the wavelength range of 250 nm to 400 nm (ultraviolet light).

SUMMARY OF THE INVENTION

However, since the conventional optical fiber having the hydroxyl-doped core region was generally used for power transmission, the diameter of the core region was very large, e.g., 200 $\mu$m. It was also difficult to focus the light emerging from the fiber into a small spot diameter of about several micrometers even with the help of a condenser lens, because propagation of light was multimode propagation. For this reason, such optical fiber was not suitable for micromachining, analysis necessitating high power irradiation at a microscopic region, and so on.

If the ultraviolet light as described above is transmitted in a single mode, the light emitted from the fiber will appear with a uniform wave front and can be focused into a small spot diameter with the help of an optical system such as a condenser lens or the like even if the fiber has some large MFD (mode field diameter). For this MFD, the Petermann I formula is known as represented by the formula below. In the formula, $\phi(r)$ represents an electric field distribution in the radial direction.

$$MFD = \sqrt{2 \times \frac{\int_0^\infty \phi^2(r) r^3 dr}{\int_0^\infty \phi^2(r) r dr}}$$

In order to make the fiber in the single mode on the other hand, it is necessary to satisfy V<2.405 in the following characteristic equation under the weakly guiding condition.

$$V = \frac{2\pi}{\lambda} a \sqrt{n_{co}^2 - n_{cl}^2}$$

In this equation, V represents a normalized frequency, $\lambda$ represents a wavelength, a represents a radius of the core, $n_{co}$ represents a refractive index of the core region, and $n_{cl}$ represents a refractive index of the cladding region.

For example, let us consider an optical fiber capable of transmitting a laser beam of an ArF excimer laser in the single mode. Supposing the wavelength of the ArF excimer laser is 193 nm (0.193 $\mu$m) and the index difference between the core and the cladding is 1% ($n_{co}$=1.4585 and $n_{cl}$=1.4439), the condition for the single mode is that the core diameter (2a) is less than 0.72 $\mu$m.

However, this core diameter is too small to feed a large power. In order to transmit a practically applicable power, the core diameter needs to be at least 2 to 3 $\mu$m and desirably not less than 4 $\mu$m. This is because even if the core diameter is large the light with the uniform wave front can be focused by optical means such as a lens or the like.

It is also possible to increase the core diameter by decreasing the relative index difference between the core and the cladding. However, the bend loss increases with decrease of the relative index difference to cause a problem in practical use. Therefore, no single mode fiber for ultraviolet light has been realized heretofore.

The present invention has been accomplished under such circumstances and an object of the invention is, therefore, to provide an optical fiber capable of transmitting the ultraviolet light in a mode field diameter of practical size.

In order to solve the above problem, an optical fiber according to the present invention is an optical fiber in which a core region and a cladding region surrounding the core region are made of a base material comprising silica glass as a principal component and in which a plurality of holes extending along an axial direction are arranged at least in the cladding region, wherein the base material has a hydroxyl mole fraction of not less than 10 ppm, or a fluorine content of not less than 0.2% by weight.

Another optical fiber according to the present invention is an optical fiber in which a core region of a hole is surrounded by a base material comprising silica glass as a principal component to form a cladding region and in which a plurality of holes extending along an axial direction are arranged in the cladding region, wherein the base material has a hydroxyl mole fraction of not less than 10 ppm, or a fluorine content of not less than 0.2% by weight.

Ultraviolet resistance of silica glass can be enhanced by adding hydroxyl or fluorine thereto. Addition of fluorine presents the effect of shifting the absorption edge to the shorter wavelength side to enhance ultraviolet transmission characteristics further. Since the placement of the holes in the cladding region can greatly vary the average refractive index of the cladding region, it becomes feasible to increase the relative index difference, as compared with the conventional fibers, and it thus becomes easy to produce the optical fiber having a small bend loss and a large MFD while transmitting the ultraviolet region.

It is preferable to employ a configuration wherein these holes are arranged in a hexagonal lattice array in a cross section orthogonal to the axial direction and wherein a relation of $d/\Lambda \leq 0.2$ or $\Lambda \leq 2.35d/\Lambda + 0.5$ holds between a diameter d of the holes and a pitch $\Lambda$ between adjacent holes. Instead, it is also preferable to employ another configuration wherein these holes are arranged in a square lattice array in a cross section orthogonal to the axial direction and wherein a relation of $\Lambda \leq -10(d/\Lambda)^2 + 10(d/\Lambda) - 1.1$ holds between a diameter d of the holes and a pitch $\Lambda$ between adjacent holes. These holes may be arranged on circumferences of concentric circles centered about the fiber axis in the cross section orthogonal to the axial direction.

The settings as described above permit the MFD to be determined as a practical size, facilitate the production of optical fiber, and permit the optical fiber to be produced with stable quality.

The base material preferably contains hydrogen of not less than $10^{16}$ molecules/cm$^3$. This makes it feasible to suppress the production of defects in the core region due to the strong ultraviolet light and thereby maintain transparency to the ultraviolet light over a long period of time.

A laser machining apparatus according to the present invention is constructed by combining either of the optical fibers according to the present invention, as described above, with a condenser lens placed at an exit end of the optical fiber. Since the above-stated optical fibers according to the present invention can have a large numerical aperture, it is feasible to reduce the size of the condenser lens, design the apparatus in short path lengths, and thereby decrease the size of the machining apparatus.

BRIEF DESCRIPTION OF DRAWINGS

FIG. 10 and FIG. 11 are graphs showing MFDs of the fundamental mode and higher order mode in the fifth embodiment, wherein FIG. 10 is a graph for the pitch L=0.4 $\mu$m and FIG. 11a graph for the pitch L=0.75 $\mu$m.

DESCRIPTION OF THE PREFERRED EMBODIMENTS

Figure 1:
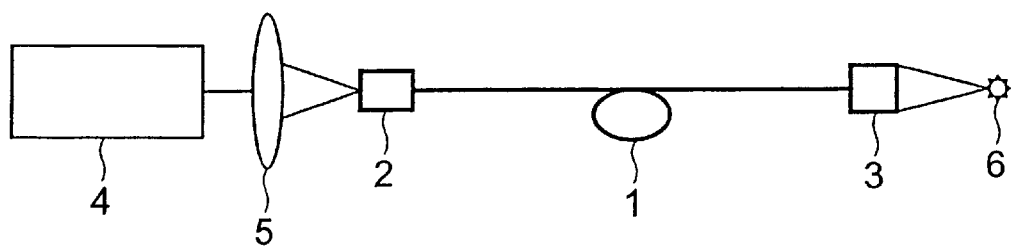
FIG. 1 is a schematic illustration of the laser machining apparatus according to the present invention.

Embodiments of the present invention will be described below on the basis of the accompanying drawings. To facilitate the comprehension of the explanation, the same reference numerals denote the same parts, where possible, throughout the drawings, and a repeated explanation will be omitted.

(First Embodiment)

FIG. 1 is a schematic illustration of the laser machining apparatus according to the present invention. This machining apparatus is constructed using the first embodiment of the optical fiber according to the present invention. The optical fiber 1 has an entrance end 2 at one end and an exit end 3 at the other end. A laser source 4 emits a light beam and a condenser lens 5 condenses the beam to inject the condensed beam into the entrance end 2. The beam is transmitted in the optical fiber 1 to be outputted from the exit end 3. The beam emerging from the exit end 3 forms a spot 6.

Figure 2:
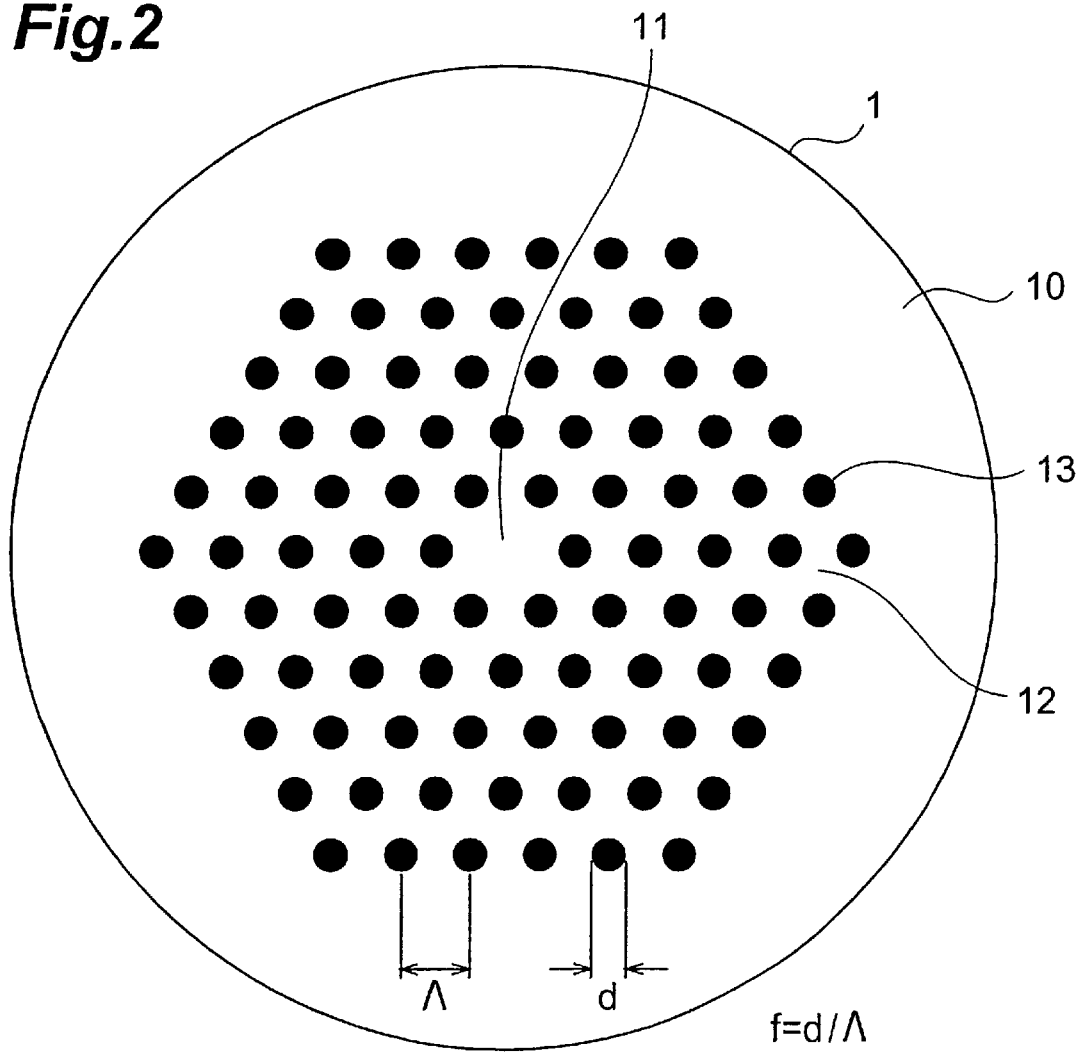
FIG. 2 is a sectional view of the first embodiment of the optical fiber according to the present invention.

FIG. 2 is a sectional view of the first embodiment of the optical fiber. The optical fiber 1 has the outside diameter of 125 $\mu$m and is made of a base material 10 of silica glass doped with 800 ppm hydroxyl. The base material 10 has the refractive index of 1.4745 at the wavelength of 365 nm. Then ninety holes 13 in total are arranged in five layers and in a hexagonal lattice array centered around the axial center, as shown in FIG. 2. The pitch $\Lambda$ between adjacent holes 13 is set as $\Lambda$=0.5 to 2.0 $\mu$m and the hole diameter d as d=0.2$\Lambda$ to 0.6$\Lambda$. There is no hole 13 located on the axial center of the optical fiber 1 and this area forms the core region 11. The cladding region 12 is comprised of the array part of the holes 13 around the core region 11. This optical fiber can be made by placing a glass rod of hydroxyl-doped silica glass at the center, bundling cylindrical pipes of the same base material around the glass rod, and melting and drawing them into a fiber.

Figure 3:
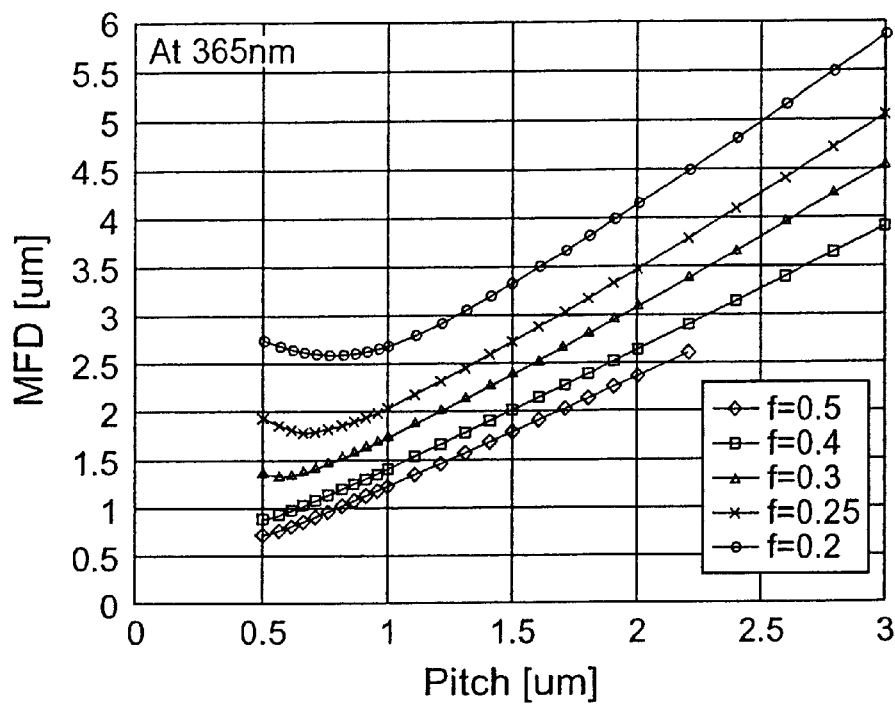
FIG. 3 is a graph showing the dependence of MFD on the pitch $\Lambda$ in the case where the ultraviolet light (i-line) with the wavelength of 365 nm is injected into the optical fiber of the first embodiment.

FIG. 3 is a graph showing the dependence of MFD on the pitch $\Lambda$, observed when the ultraviolet light with the wavelength of 365 nm (i-line) was injected into the optical fiber 1. Typical values in this case are presented in Table 1.

TABLE 1

Dependence of MFD on Pitch

| pitch $\Lambda$ ($\mu$m) | Index f = d/$\Lambda$ | MFD ($\mu$m) | spot diameter ($\mu$m) |
| --- | --- | --- | --- |
| 0.5 | 0.2 | 3.0 | 2.8 |
| 0.5 | 0.3 | 1.3 | 1.1 |
| 0.5 | 0.5 | 0.7 | 0.6 |
| 1.0 | 0.2 | 2.7 | 2.3 |
| 1.0 | 0.3 | 1.8 | 1.5 |
| 1.0 | 0.5 | 1.2 | 1.0 |
| 2.0 | 0.2 | 4.0 | 3.2 |
| 2.0 | 0.3 | 3.0 | 2.4 |
| 2.0 | 0.5 | 2.2 | 1.8 |

The spot size herein presents examples of spot diameters in use of the same optical system. It is noted that the spot diameter can be decreased or increased by design of the optical system and thus is not limited to this relation between spot size and MFD.

In order to keep the MFD in the size suitable for practical use, e.g., in the range of not less than 2 $\mu$m, it is necessary to satisfy the condition of f$\leq$0.2 or $\Lambda$$\leq$2.35f+0.5. When $\Lambda$$\geq$1.8 at f=0.5, propagation in the fiber was close to the multimode propagation.

The optical fiber of the present embodiment can have better endurance of transmittance to short-wavelength light, e.g., to ultraviolet light and realize an effectively high NA (numerical aperture), as compared with the conventional optical fibers. In the conventional optical fibers, in order to increase the index difference on the basis of the decrease of the refractive index of the cladding region by fluorine doping, it was necessary to dope the cladding region with a large amount of fluorine. There was, however, a limit of the fluorine doping and it was difficult to increase NA, for example, over 0.2. The low NA raised the disadvantage of large bend loss and a difficulty in focusing the output light by the condenser lens. In contrast with it, the optical fiber of the present embodiment permits the index difference to be set at a large value without relying on the fluorine doping, whereby it is feasible to realize a satisfactorily large NA of not less than 0.18. This makes it feasible to narrow down the spot size, design optical paths in short path lengths between the exit end and the spot, and downsize the apparatus.

The doping of the base material with hydroxyl yields the effect of enhancing the transmission characteristics for the excimer laser and KrF and ArF laser beams. In order to achieve the satisfactory effect, it is preferable to dope the base material with hydroxyl in a mole fraction of not less than 10 ppm.

(Second Embodiment)

Figure 4:
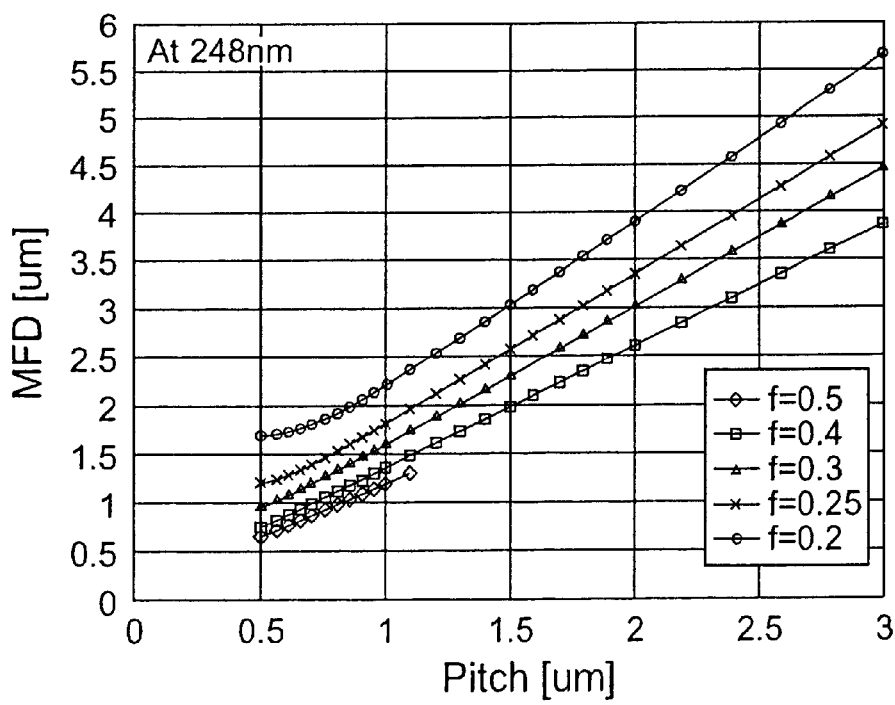
FIG. 4 is a graph showing the dependence of MFD on the pitch $\Lambda$ in the case where the KrF excimer laser light with the wavelength of 248 nm is injected into the optical fiber of the second embodiment.

The optical fiber of the second embodiment has substantially the same structure as that of the first embodiment shown in FIG. 2. However, the optical fiber of the present embodiment is different in that the base material 10 is silica glass doped with approximately 0.8 wt % fluorine. FIG. 4 shows the dependence of MFD on the pitch $\Lambda$, observed when the KrF excimer laser beam with the wavelength of 248 nm was injected into this optical fiber. When f=0.4, the MFD is realized in the range of 1.5 $\mu$m to 2.0 $\mu$m. The inventor also measured change of output power against the number of shots and obtained the following results: against the initial transmittance of 100%, the transmittance after $10^6$ shots was 95% and the transmittance after $10^8$ shots was 85%. It was thus verified that the optical fiber also had excellent ultraviolet resistance.

Since the doping with fluorine shifts the absorption edge to the shorter wavelength side, the present embodiment achieves the effect of enhancing the transmission characteristics for shorter-wavelength ultraviolet light, e.g., the $F_2$ excimer laser light with the wavelength of 157 nm. In order to attain satisfactory suppression, it is preferable to dope the base material with fluorine in the content of not less than 0.2% by weight.

(Third Embodiment)

Figure 5:
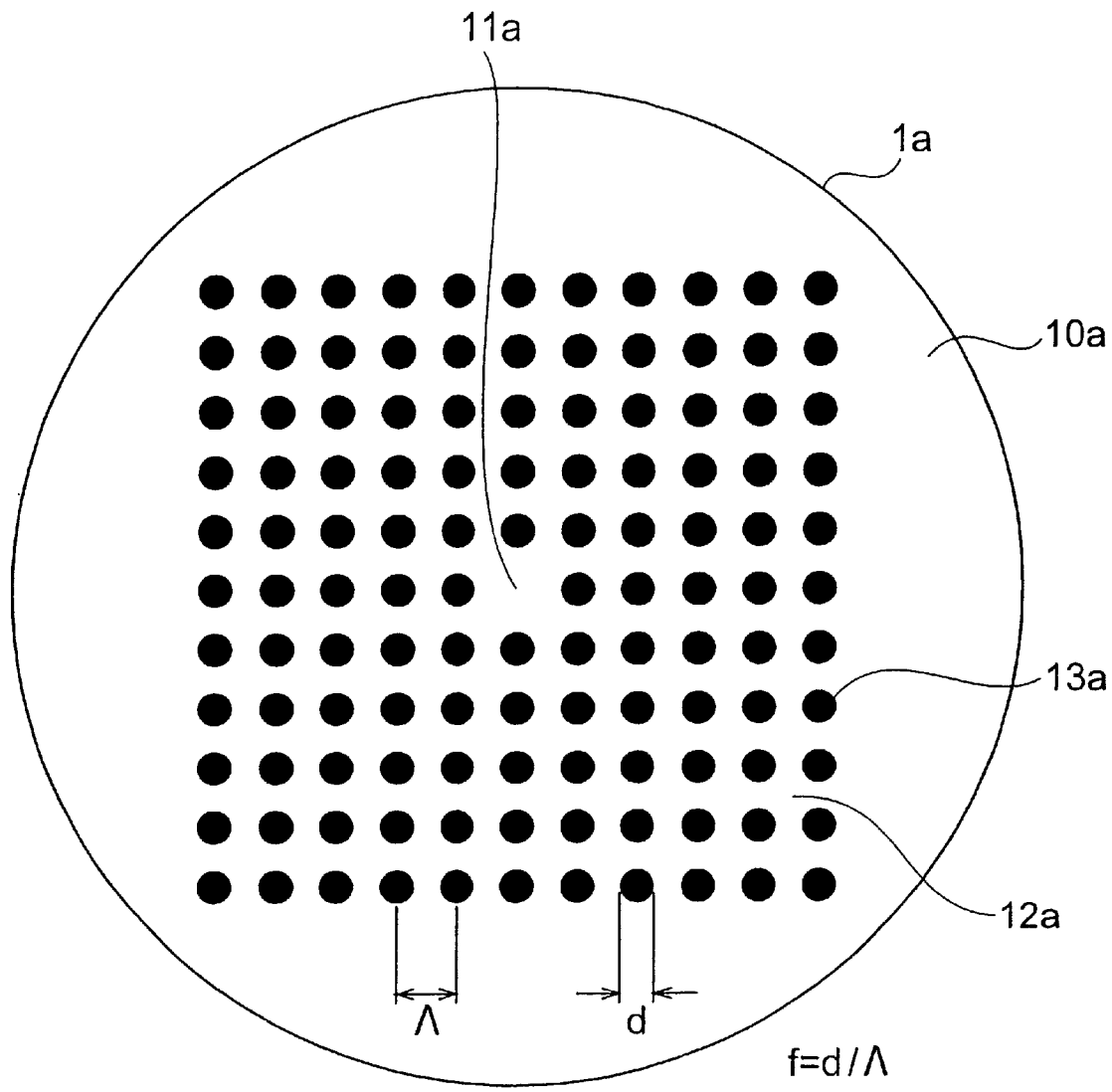
FIG. 5 is a sectional view of the third embodiment of the optical fiber according to the present invention.

FIG. 5 is a sectional view of the third embodiment of the optical fiber according to the present invention. Just as the optical fiber 1 in the first embodiment shown in FIG. 2, the optical fiber 1a has the outside diameter of 125 $\mu$m and is made of the base material 10a of silica glass doped with 800 ppm hydroxyl, and the base material 10a has the refractive index of 1.4745 at the wavelength of 365 nm. In the present embodiment, as shown in FIG. 5, there are one hundred and twenty holes 13a in total arranged in an 11×11 square lattice array except in the central area around the axial center. The central area without the holes 13 constitutes the core region 11a and the area around the core region forms the cladding region 12a. The pitch $\Lambda$ between adjacent holes 13a is set as $\Lambda$=0.5 to 2.0 $\mu$m and the hole diameter d as d=0.3$\Lambda$ to 0.6$\Lambda$.

Figure 6:
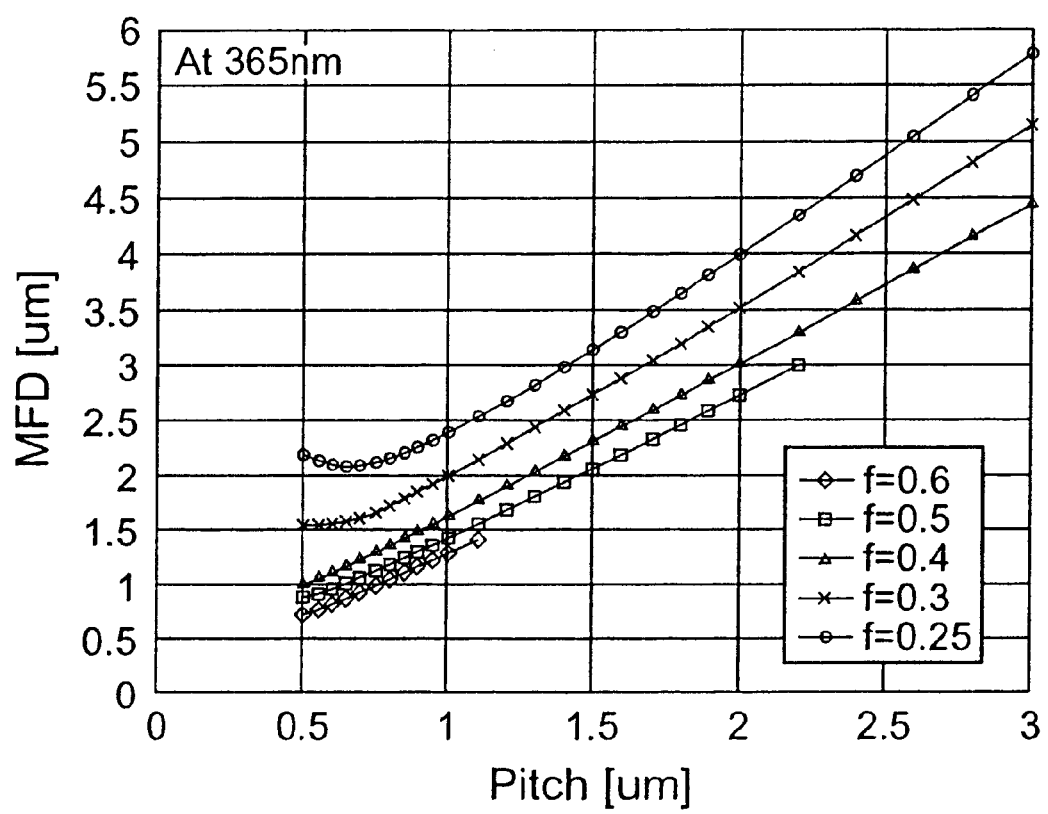
FIG. 6 is a graph showing the dependence of MFD on the pitch $\Lambda$ in the case where the i-line is injected into the optical fiber of the third embodiment.

FIG. 6 shows the dependence of MFD on the pitch $\Lambda$, observed when the i-line was injected into the optical fiber of the third embodiment. In order to keep the MFD in the size suitable for practical use, e.g., in the range of not less than 2 $\mu$m, it is necessary to satisfy the condition of $\Lambda \leq -10(d/\Lambda)^2+10(d/\Lambda)-1.1$. When $\Lambda \geq 1.1$ at f=0.6, the propagation in the fiber was close to the multimode propagation.

The optical fiber of the present embodiment also achieves the same effect as the optical fiber of the first embodiment. The hexagonal lattice array is likely to induce the multimode propagation with increase in the hole size, whereas the square lattice array is less likely to induce the multimode propagation with increase of the hole size, because the holes are less dense than in the hexagonal lattice array. Since large-diameter holes have low surface tension during fiber drawing and are resistant to crush during the fiber drawing, there is also an advantage of facilitating the fiber drawing.

(Fourth Embodiment)

Figure 7:
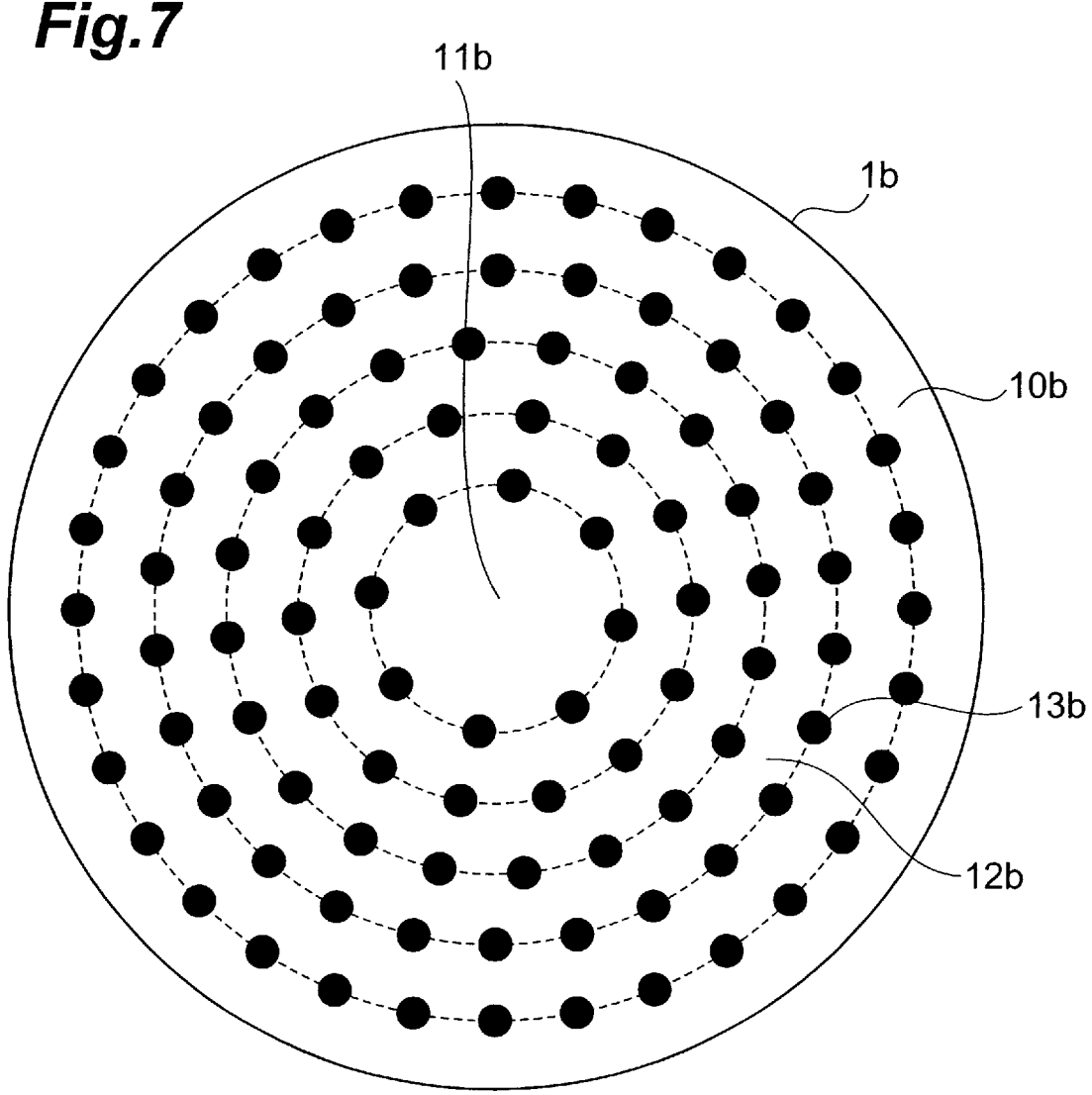
FIG. 7 is a sectional view of the fourth embodiment of the optical fiber according to the present invention.

FIG. 7 is a sectional view of the fourth embodiment of the optical fiber according to the present invention. In the optical fiber 1b of the present embodiment, as shown in FIG. 7, a plurality of holes 13b are provided substantially at equal intervals on circumferences of concentric circles centered about the center of the fiber. The number of concentric circles herein is 5. The numbers of holes on the respective, concentric circles are 8, 14, 20, 26, and 32 from the inside. The radii of the holes 13b are substantially uniform in the cross section of the fiber, and the radii and the positions of the holes are set as presented in Table 2. In Table 2, the dimensions are defined on the basis of the core radius, and the core 11b is defined as a maximum circle including the center of the fiber but excluding the holes 13b. The hole area rate is an index indicating a rate of the area occupied by the holes 13b, and Table 2 presents five types of structures having different hole area rates. The outside diameter of the fibers is 125 $\mu$m and the base material 10b is silica glass doped with hydroxyl in the mole fraction of 800 ppm.

TABLE 2

Structures of Optical Fibers in Fourth Embodiment

| Hole area rate F | hole radius/ core radius | Hole position/core radius | | | | |
|---|---|---|---|---|---|---|
| | | 1st layer | 2nd layer | 3rd layer | 4th layer | 5th layer |
| 3.1% | 0.085 | 1.085 | 1.938 | 2.791 | 3.643 | 4.496 |
| 4.8% | 0.109 | 1.109 | 1.980 | 2.852 | 3.723 | 4.594 |
| 6.9% | 0.134 | 1.134 | 2.024 | 2.915 | 3.806 | 4.696 |
| 12.2% | 0.186 | 1.186 | 2.119 | 3.051 | 3.983 | 4.915 |
| 19.1% | 0.244 | 1.244 | 2.222 | 3.200 | 4.178 | 5.155 |

Figure 8:
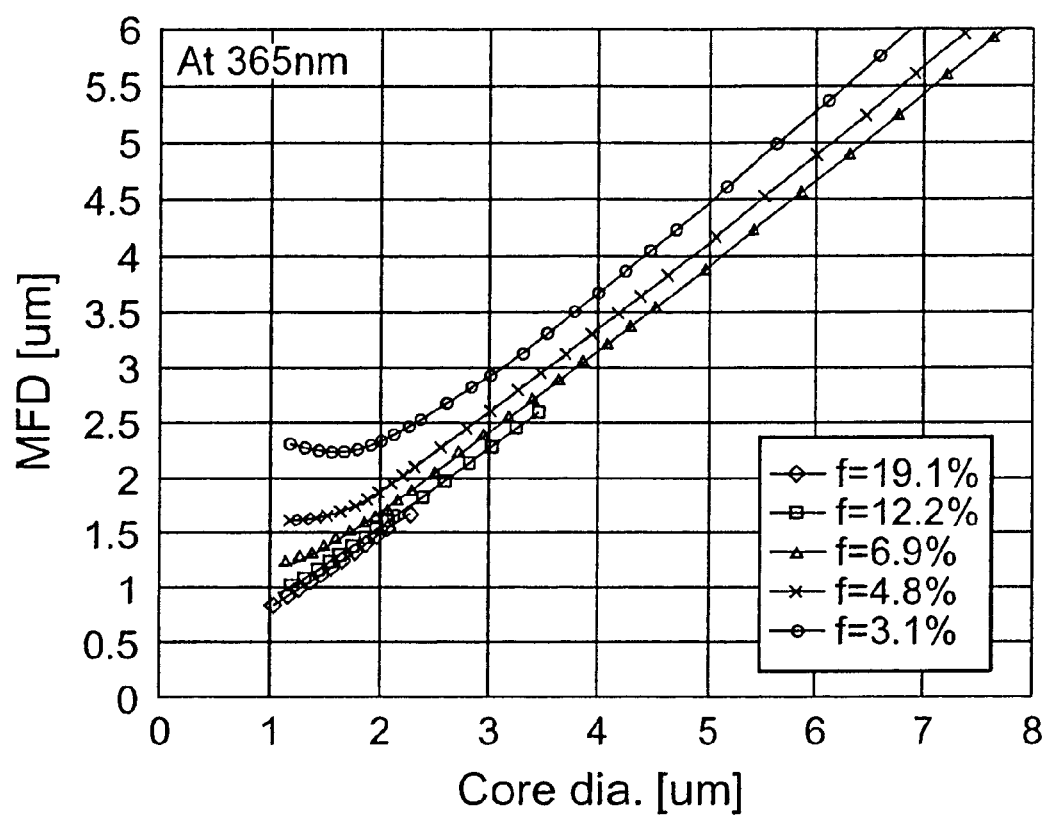
FIG. 8 is a graph showing the dependence of MFD on the core diameter in the case where the i-line is injected into the optical fiber of the fourth embodiment.

FIG. 8 is a graph showing the dependence of MFD on the core diameter, observed when the i-line was injected into these optical fibers in the fourth embodiment. The hole positions and hole sizes were also varied in proportion to the core sizes. As apparent from FIG. 8, the MFD can be realized in the practically preferred range of not less than 2 $\mu$m by increase of the core diameter.

The present embodiment also achieved the same effect as the first to third embodiments did. When the core is formed by arranging a plurality of holes in a lattice array and providing a part with no hole, the core diameter is restricted to either of integral multiples of the lattice period. In contrast to it, the core diameter can be freely determined in the array on the circumferences. For this reason, it is feasible to realize desired characteristics about the MFD and others. Since the power distribution of light in the cross section of the fiber is substantially axially symmetric, the pattern of output light is independent of the rotational orientation of the fiber. This facilitates machining and others with the output light.

(Fifth Embodiment)

Figure 9:
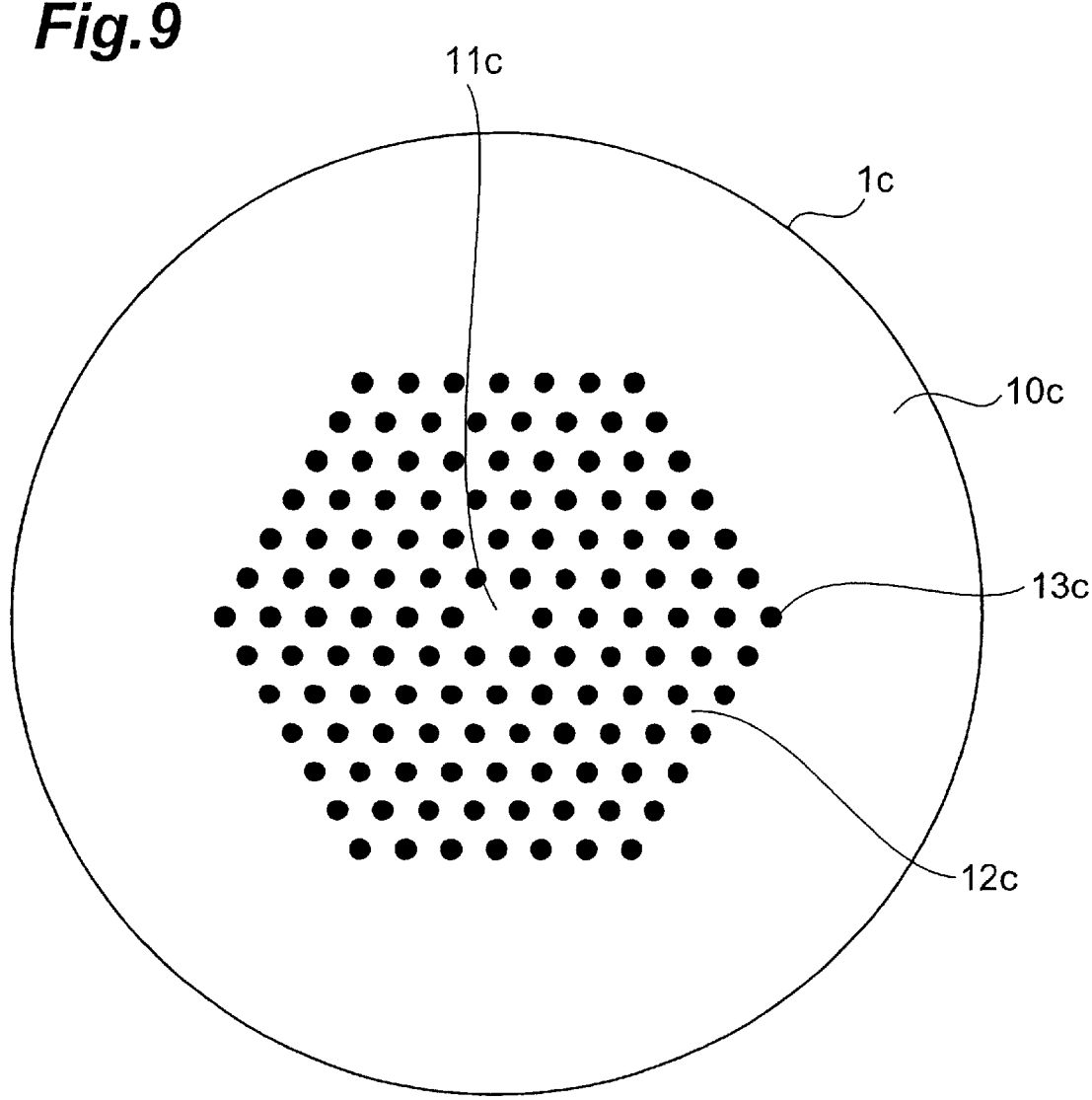
FIG. 9 is a sectional view of the fifth embodiment of the optical fiber according to the present invention.

FIG. 9 is a sectional view of the fifth embodiment of the optical fiber according to the present invention. As shown in FIG. 9, holes of uniform diameters are arranged in a hexagonal lattice array and an area without any hole is present at the center of the array to form a core region. The ratio of the core diameter d to the pitch L is set as d/L=0.5 and the number of holes along a radial direction is 6.

Figure 10:
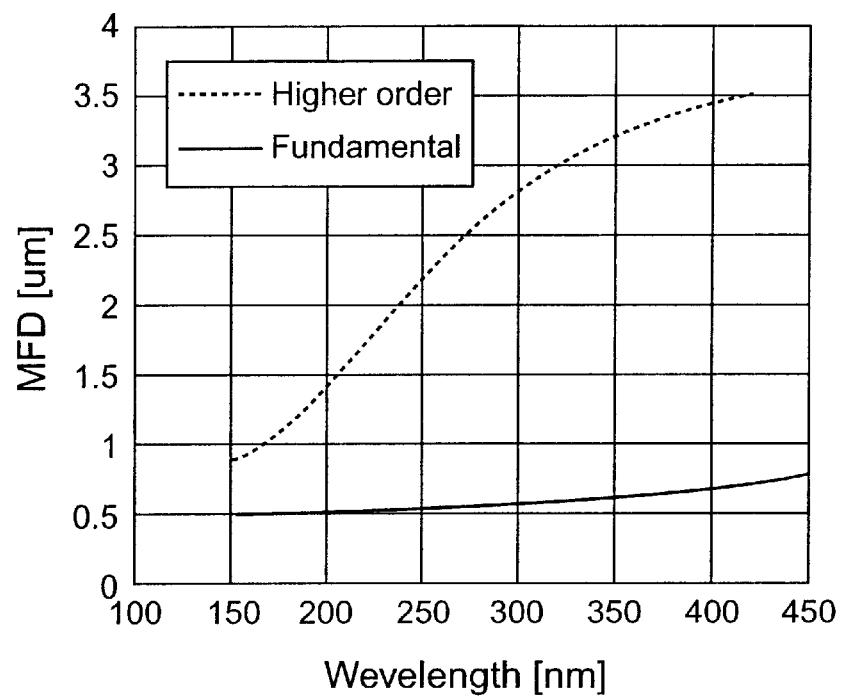

FIG. 10 shows the MFDs of the fundamental mode and a higher order mode where the pitch L=0.4 μm. In the wavelength band of 150 nm to 250 nm, the MFD of the fundamental mode is as small as about 0.5 μm, whereas the MFD of the higher order mode is as large as MFD>0.9 μm. This means that the light of the fundamental mode is guided while being well confined in the core region whereas the light of the higher order mode leaks to the outside of the core region to be substantially cut off, i.e., that the fiber acts as a single-mode fiber. On the long wavelength side over 250 nm, the MFD of the fundamental mode also increases with increase of the wavelength on the other hand. This indicates that the degree of confinement of light in the core region is weakened to increase the bend loss. Namely, the fiber is substantially unusable in terms of the bend loss.

Figure 11:
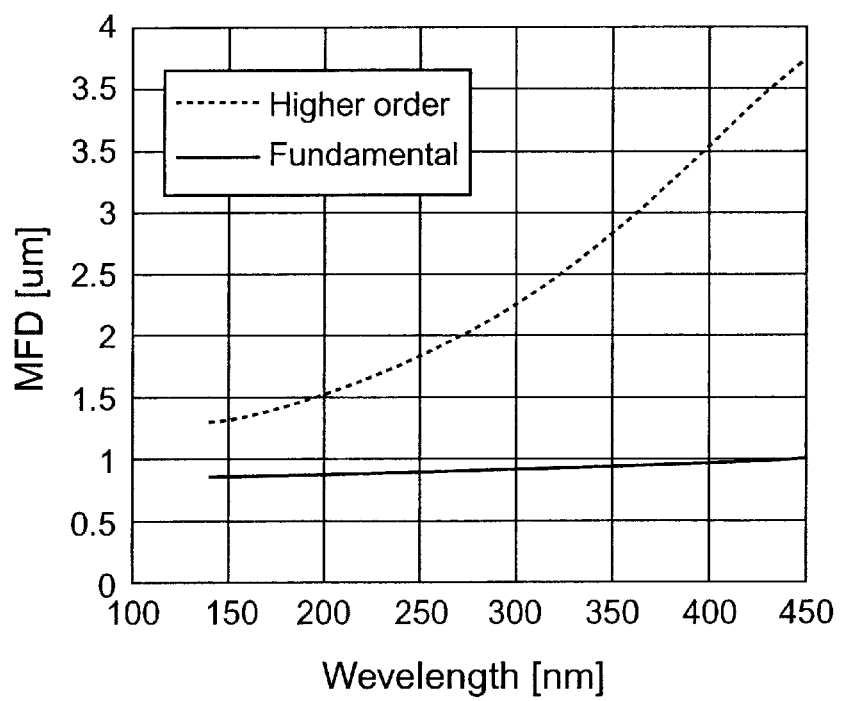

FIG. 11 shows the MFDs of the fundamental mode and the higher order mode where the pitch L=0.75 μm. Since throughout the wavelength band of 150 nm to 250 nm the MFD of the fundamental mode is as small as 1 μm while the MFD of the higher order mode is as large as MFD>1.3 μm, it is shown that the fiber acts as a single-mode fiber in this wavelength band. The bend loss at the wavelength of 400 nm was not more than 1 dB/m in the radius of curvature of 20 mm. This indicates that the fiber is substantially usable in the wavelength band of 150 nm to 400 nm.

(Sixth Embodiment)

Figure 12:
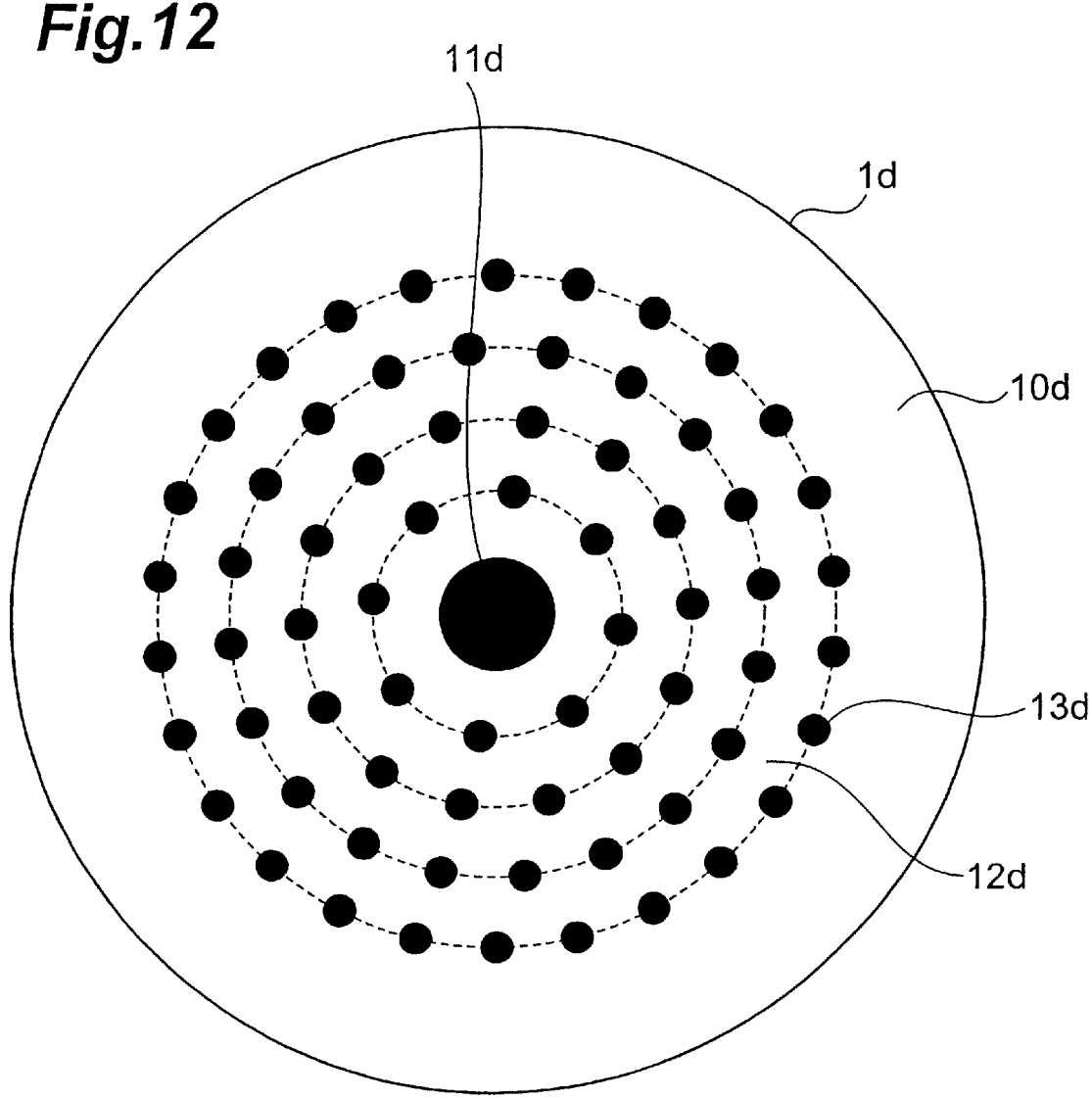
FIG. 12 is a sectional view of the sixth embodiment of the optical fiber according to the present invention.

FIG. 12 is a sectional view of the sixth embodiment of the optical fiber according to the present invention. As shown in FIG. 12, the optical fiber of the present embodiment is made of a base material 10d of silica glass and in a tubular form, a hole 11d at the axial center forms the core region, and a plurality of fine holes 13d are arranged in the cladding region 12d. FIG. 12 shows the arrangement in which the fine holes 13d are arranged on circumferences of concentric circles, as in the fourth embodiment shown in FIG. 7, but the holes may also be arranged in the square lattice array or in the hexagonal lattice array, as shown in FIG. 2 or in FIG. 5.

In this embodiment the silica glass making the cladding region 12d has a hydroxyl mole fraction of not less than 10 ppm, or a fluorine content of not less than 0.2% by weight. This can suppress the deterioration due to ultraviolet absorption of the glass making the cladding region.

Since the core is hollow in this structure, there occurs no deterioration of the core region itself due to the ultraviolet light and the transmission loss can be low. It is easy to design the fiber so as to have at least one transmissible mode in the ultraviolet region and it is thus feasible to realize the optical fiber with a high NA and a large MFD.

The silica glass as the base material of the optical fiber according to the present invention preferably contains hydrogen of $10^{16}$ molecules/cm$^3$. This enables the optical fiber to maintain its transparency to the ultraviolet light over a long period of time. Immediately after addition of hydrogen, the silica glass is exposed to approximately $10^6$ pulses of KrF or ArF laser light to fix hydrogen. Without the fixing treatment, hydrogen will leave within 200 days. With the fixing treatment, the effect of hydrogen can be maintained over one year.

In the optical fibers described above, where the mode field diameter is designed to be three or more times larger than the wavelength of the light, the MFD (Mode Field Diameter) is large enough to keep the optical power density low in the fiber core, so as to be able to avoid breakage of the fiber due to the light with high power. This enables transmission of light with higher power. Since the output light can be focused into a small spot diameter, it is feasible to raise the power density of the output light. This results in enhancing machinability in ablation and others and the excitation property in fluorometric analysis.

The optical fibers according to the present invention can be applied to semiconductor reduction exposure equipment, monitor light delivery, irradiation apparatus, medical excimer laser irradiation apparatus, spectral analysis apparatus, cell machining apparatus in biotechnology, material machining apparatus, and so on.

What is claimed is:

1. An optical fiber for transmitting light in which a core region and a cladding region surrounding the core region are made of a base material comprising silica glass as a principal component and in which a plurality of holes extending along an axial direction are arranged at least in said cladding region,
    wherein said base material has a hydroxyl mole fraction of not less than 10 ppm, or a fluorine content of not less than 0.2% by weight.

2. The optical fiber according to claim 1, wherein said plurality of holes are arranged in a hexagonal lattice array in a cross section orthogonal to the axial direction and wherein a relation of $d/\Lambda \leq 0.2$ or $\Lambda \leq 2.35d/\Lambda + 0.5$ holds between a diameter d of the holes and a pitch Λ between adjacent holes, and a mode field diameter of the optical fiber is not less than 2 μm.

3. The optical fiber according to claim 1, wherein said plurality of holes are arranged in a square lattice array in a cross section orthogonal to the axial direction and wherein a relation of $\Lambda \leq -10(d/\Lambda)^2 + 10(d/\Lambda) - 1.1$ holds between a diameter d of the holes and a pitch Λ between adjacent holes, and a mode field diameter of the optical fiber is not less than 2 μm.

4. The optical fiber according to claim 1, wherein said plurality of holes are arranged on circumferences of concentric circles centered about the axis of the fiber in a cross section orthogonal to the axial direction.

5. The optical fiber according to claim 1, wherein said base material contains hydrogen of not less than $10^{16}$ molecules/cm$^3$ at least in the core region.

6. An optical fiber for transmitting light in which a core region of a hole is surrounded by a base material comprising silica glass as a principal component to form a cladding region and in which a plurality of holes extending along an axial direction are arranged in said cladding region,
    wherein, said optical fiber supports at least one transmissible mode at a wavelength shorter than 400 nm, and said base material has a hydroxyl mole fraction of not less than 10 ppm, or a fluorine content of not less than 0.2% by weight.

7. The optical fiber according to claim 6, wherein said base material contains hydrogen of $10^{16}$ molecules/cm$^3$.

8. A laser machining apparatus comprising the optical fiber as set forth in claim 1, and a condenser lens located at an output end of said optical fiber.

9. A laser machining apparatus comprising the optical fiber as set forth in claim 6, and a condenser lens located at an output end of said optical fiber.

* * * * *